United States Patent
Chen et al.

(10) Patent No.: US 10,639,744 B2
(45) Date of Patent: May 5, 2020

(54) METHOD OF LASER JOINING OF DISSIMILAR MATERIALS WITH ULTRASONIC AID

(71) Applicants: THE HONG KONG POLYTECHNIC UNIVERSITY, Hong Kong (HK); Guangdong University of Technology, Panyu District, Guangzhou (CN)

(72) Inventors: Yujiao Chen, Hong Kong (HK); Tai Man Yue, Hong Kong (HK); Zhongning Guo, Guangzhou (CN)

(73) Assignees: THE HONG KONG POLYTECHNIC UNIVERSITY, Hong Kong (CN); Guangdong University of Technology, Guangzhou (CN)

( * ) Notice: Subject to any disclaimer, the term of this patent is extended or adjusted under 35 U.S.C. 154(b) by 540 days.

(21) Appl. No.: 15/147,899

(22) Filed: May 5, 2016

(65) Prior Publication Data
US 2017/0320167 A1 Nov. 9, 2017

(51) Int. Cl.
*B23K 26/324* (2014.01)
*B29C 65/00* (2006.01)
(Continued)

(52) U.S. Cl.
CPC ........ *B23K 26/324* (2013.01); *B23K 26/0006* (2013.01); *B23K 26/21* (2015.10);
(Continued)

(58) Field of Classification Search
CPC .... B23K 26/324; B23K 26/244; B23K 26/70; B23K 26/32; B23K 28/02; B23K 37/0435;
(Continued)

(56) References Cited

U.S. PATENT DOCUMENTS

| 6,515,218 B1* | 2/2003 | Shimizu | H01L 31/0201 |
| | | | 136/244 |
| 6,892,927 B2* | 5/2005 | Rumer | B23K 20/005 |
| | | | 219/121.6 |

(Continued)

FOREIGN PATENT DOCUMENTS

| CN | 203541843 A | 4/2014 |
| CN | 104607811 A | 5/2015 |

(Continued)

OTHER PUBLICATIONS

Translaltion CN 105364326 (Year: 2019).*
(Continued)

*Primary Examiner* — Ibrahime A Abraham
*Assistant Examiner* — Frederick F Calvetti
(74) *Attorney, Agent, or Firm* — Spruson & Ferguson (Hong Kong) Limited

(57) ABSTRACT

A new ultrasonic aided laser joining method (UAL) for bonding dissimilar materials has been developed. The method is capable of eliminating the laser-induced bubbles at the bonding faces and to improve the joint strength over that of the conventional laser-assisted metal and plastic joining method (LAMP). Some experiments on joining titanium to polyethylene terephthalate have been conducted to show the superiority of UAL over LAMP. The results showed that the joint strength, measured in terms of failure load, was significantly increased when ultrasonic vibration was employed during laser joining. For the LAMP joined specimens, fracture normally occurred at the metal-plastic interface, whereas for the UAL joined specimens, fracture normally occurred in the parent plastic part. The improvement in joint strength is mainly due to the elimination of pores in the resolidified plastic. In addition, ultrasound (Continued)

vibration promotes chemical bonding between the plastic and metal parts, and this is supported by the XPS results.

10 Claims, 10 Drawing Sheets

(51) Int. Cl.
| | |
|---|---|
| *B23K 26/57* | (2014.01) |
| *B23K 26/70* | (2014.01) |
| *B23K 26/244* | (2014.01) |
| *B29C 65/82* | (2006.01) |
| *B29C 65/08* | (2006.01) |
| *B29C 65/44* | (2006.01) |
| *B29C 65/72* | (2006.01) |
| *B29C 65/16* | (2006.01) |
| *B23K 26/21* | (2014.01) |
| *B23K 26/346* | (2014.01) |
| *B23K 26/00* | (2014.01) |
| *B23K 103/00* | (2006.01) |
| *B23K 103/14* | (2006.01) |
| *B23K 103/18* | (2006.01) |
| *B29C 35/08* | (2006.01) |

(52) U.S. Cl.
CPC .......... *B23K 26/244* (2015.10); *B23K 26/346* (2015.10); *B23K 26/57* (2015.10); *B23K 26/70* (2015.10); *B29C 65/08* (2013.01); *B29C 65/1635* (2013.01); *B29C 65/44* (2013.01); *B29C 65/72* (2013.01); *B29C 65/8253* (2013.01); *B29C 66/1122* (2013.01); *B29C 66/342* (2013.01); *B29C 66/41* (2013.01); *B29C 66/43* (2013.01); *B29C 66/71* (2013.01); *B29C 66/7392* (2013.01); *B29C 66/742* (2013.01); *B29C 66/7428* (2013.01); *B29C 66/7461* (2013.01); *B29C 66/8122* (2013.01); *B29C 66/81267* (2013.01); *B29C 66/8322* (2013.01); *B29C 66/9517* (2013.01); *B23K 2103/14* (2018.08); *B23K 2103/18* (2018.08); *B23K 2103/42* (2018.08); *B29C 65/8215* (2013.01); *B29C 2035/0838* (2013.01)

(58) Field of Classification Search
CPC .............. B23K 1/06; B23K 20/10–106; B23K 37/04–0461; B25B 1/00; B25B 3/00
USPC ............ 219/121.63, 121.64, 161; 156/272.8; 228/1.1, 110.1, 212–213, 44.3–44.7, 175; 269/43, 45, 266
See application file for complete search history.

(56) References Cited

U.S. PATENT DOCUMENTS

| | | | | |
|---|---|---|---|---|
| 6,949,154 B2* | 9/2005 | Hochrainer | ............. | A61J 3/072 156/272.8 |
| 7,153,384 B2* | 12/2006 | Sugawara | ............. | B23K 26/18 156/272.8 |
| 7,713,607 B2* | 5/2010 | Sugawara | ................. | C09B 1/32 428/57 |
| 7,790,999 B2* | 9/2010 | Olowinsky | ............ | B23K 26/08 219/121.64 |
| 7,879,929 B2* | 2/2011 | Sugawara | ............ | B29C 66/712 156/272.8 |
| 7,960,003 B2* | 6/2011 | Kihara | ................... | B29C 53/40 156/272.8 |
| 7,960,012 B2* | 6/2011 | Kihara | ................... | B29C 53/40 156/272.8 |
| 8,008,387 B2* | 8/2011 | Miyamoto | ......... | B29C 66/1122 156/272.8 |
| 8,318,051 B2* | 11/2012 | Adachi | .............. | B29C 66/7392 252/582 |
| 8,415,007 B2* | 4/2013 | Honma | ..................... | B32B 5/10 428/299.1 |
| 8,585,753 B2* | 11/2013 | Scanlon | .................... | A61F 2/07 623/1.42 |
| 2007/0207186 A1* | 9/2007 | Scanlon | .................... | A61F 2/07 424/424 |
| 2008/0318110 A1* | 12/2008 | Budinski | ............. | H01M 8/0221 429/434 |
| 2009/0194709 A1* | 8/2009 | Kuo | ....................... | B23K 28/02 250/492.1 |
| 2009/0242523 A1* | 10/2009 | Nakamae | ........... | B23K 26/0604 219/121.64 |
| 2011/0036479 A1* | 2/2011 | Kawazoe | ............. | B01J 19/0093 156/73.2 |
| 2015/0269471 A1* | 9/2015 | Finn | ........................ | H05K 3/46 235/492 |
| 2016/0354859 A1* | 12/2016 | Wang | ................. | B29C 66/92611 |
| 2016/0354974 A1* | 12/2016 | Wang | ................. | B29C 66/92611 |
| 2016/0355904 A1* | 12/2016 | Achuthan | ............. | C21D 10/00 |

FOREIGN PATENT DOCUMENTS

| | | | |
|---|---|---|---|
| CN | 105364326 A | | 3/2016 |
| CN | 105414763 | * | 3/2016 |

OTHER PUBLICATIONS

Translation CN105414763 (Year: 2019).*
M. Grujicic, et al, An overview of the polymer-to-metal direct-adhesion hybrid technologies for load-bearing automotive components, journal of materials processing technology 197 (2008) 363-373.
T. Sultana, et al, Study of two different thin film coating methods in transmission laser micro-joining of thin Ti-film coated glass and polyimide for biomedical applications, Journal of Themechanical Behavior of Biomedical Materials 2 (2009) 237-242.
S.T. Amancio-Filho, et al, Joining of Polymers and Polymer-Metal Hybrid Structures: Recent Developments and Trends, Polymer Engineering and Science—2009, 1461-1467.
Seiji Katayama, et al, Laser direct joining of metal and plastic, Scripta Materialia 59 (2008) 1247-1250.
S. Katayama, Laser joining of metal and plastic, Industrial Laser Solutions, Nov. 1, 2010. http://www.industrial-lasers.com/articles/print/volume-250/issue-6/features/laser-joining-of-metal-and-plastic.html, retrieved on Jun. 8, 2016.
Yousuke Kawahito et al, LAMP Joining between Ceramic and Plastic, Physics Procedia 12 (2011) 174-178.
Yousuke Kawahito et al, Laser direct joining between stainless steel and polyethylene terephthalate plastic and reliability evaluation of joints, Welding International, 2014 vol. 28, No. 2, 107-113.
Y. Farazila, et al, YAG Laser Spot Welding of PET and Metallic Materials, JLMN—Journal of Laser Micro Nanoengineering vol. 6, No. 1,2011, 69-74.
M. Wahba, et al, Laser direct joining of AZ91D thixomolded Mg alloy and amorphous polyethylene terephthalate, Journal of Materials Processing Technology 211 (2011) 1166-1174.
Ian Jones, Laser welding for plastic components, Assembly Automation, vol. 22—No. 2—2002—pp. 129-135.
G. C;am, et al, Progress in joining of advanced materials, International Materials Reviews 1998 vol. 43 No. 1, 1-44.
Andreas Roesner, et al, Innovative approach of joining hybrid components, J. Laser Appl., vol. 23, No. 3, Aug. 2011 Article No. 032007.
Ren-Yu Yeh, et al, Development of ultrasonic direct joining of thermoplastic to laser structured metal, International Journal of Adhesion & Adhesives 65 (2016) 28-32.
First Office Action with Search Report of CN201710313377.6 issued by the China National Intellectual Property Administration (CNIPA) of the PRC dated Sep. 11, 2018.
Li et al.; Laser Transmission Joining Process of PET Films and Titanium; Chinese Journal of Lasers, vol. 37, No. 7, p. 1914-1916; Jul. 31, 2010.

(56) References Cited

OTHER PUBLICATIONS

Third Office Action with Search Report of CN201710313377.6 issued by the China National Intellectual Property Administration (CNIPA) of the PRC dated Aug. 14, 2019.

* cited by examiner (C)

(D)

| Pulsed frequency: 20 Hz; Welding speed: 4 mm/s | | | | |
|---|---|---|---|---|
| Laser Power | 45W | 55W | 65W | 75W |
| Without ultrasound (LAMP) | | | | |
| With ultrasound (UAL) | | | | |

(A)                      (B)

METHOD OF LASER JOINING OF DISSIMILAR MATERIALS WITH ULTRASONIC AID

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to a joining system, and more particularly, relates to an ultrasound aided laser joining system for joining two different materials together, and the corresponding operation methods.

BACKGROUND

The following references are cited in the specification. Disclosures of these references are incorporated herein by reference in their entirety.

LIST OF REFERENCES

[1] M. Grujicic, V. Sellappan, M. A. Omar, Norbert Seyr, Andreas Obieglo, Marc Erdmann, Jochen Holzleitner, An overview of the polymer-to-metal direct-adhesion hybrid technologies for load-bearing automotive components, Journal of Materials Processing Technology 197 (2008) pp. 363-373.

[2] T. Sutana, G. L. Georgiev, R. J. Baird, G. W. Auner, G. Newaz, R. Patwa, H. J. Herfurth, Study of two different thin film coating methods in transmission laser microjoining of thin Ti-film coated glass and polyimide for biomedical applications, Journal of the Mechanical Behavior of Biomedical Materials 2(3) (2009) pp. 237-242.

[3] S. T. Amancio-Filho, J. F. dos Santos, Joining of polymers and polymers—metal hybrid structures: Recent developments and trends, Polymer Engineering and Science 49(8) (2009) pp. 1461-1476.

[4] S. Katayama, Y. Kawahito, Laser direct joining of metal and plastic. Scripta Materialia 59(12) (2008) pp. 1247-1250.

[5] S. Katayama, Laser joining of metal and plastic, Industrial Laser Solutions, 11 Jan. 2010. http://www.industrial-lasers.com/articles/print/volume-250/issue-6/features/laser-joining-of-metal-and-plastic.html

[6] Y. Kawahito, K. Nishimoto, S. Katayama, LAMP joining between ceramic and plastic, *Physics Procedia* 12 (2011) pp. 174-178.

[7] Y. Kawahito, Y. Niwa and S. Katayama, Laser direct joining between stainless steel and polyethylene terephthalate plastic and reliability evaluation of joints, Welding International 28(2) (2014) pp. 107-113.

[8] Y. Farazila, Y. Miyashita, W. Hua, Y. Mutoh, Y. Otsuka, YAG laser spot welding of PET and metallic materials, Journal of Laser Micro/Nanoengineering 6(1) (2011) pp. 69-74.

[9] M. Wahba, Y. Kawahito, S. Katayama, Laser direct joining of AZ91D thixomolded Mg alloy and amorphous polyethylene terephthalate, Journal of Materials Processing Technology 211(6) (2011) pp. 1166-1174.

[10] I. Jones, Laser welding for plastic components, Assembly Automation 22(2) (2002) pp. 129-135.

[11] G. Çam, M. Koçok, Progress in joining of advanced materials, International Materials Reviews 43(1) (1998) pp. 1-44.

[12] A. Roesner, S. Scheik, A. Olowinsky, A. Gillner, R. Poprawe, M. Schleser, U. Reisgen, Innovative approach of joining hybrid components, Journal of Laser Applications 23(3) (2011) Article no. 032007.

[13] R. Y. Yeh, R. Q. Hsu, Development of ultrasonic direct joining of thermoplastic to laser structured metal, International Journal of Adhesion and Adhesives 65 (2016) pp. 28-32.

In recent years, considerable interest has been shown in joining dissimilar materials such as light metals and plastics, especially in automobiles and biomedical industries [1, 2]. The demands of integrating different materials are obvious, due to resource and energy saving, environmental concerns, as well as requirements for high functionality of light weight products. Indeed, many automobiles and biomedical products are made of multi-components where various types of materials are used and the advantages of each material are realized. In fact, joining of plastics to metals is not new; conventionally, joining methods consist of adhesive bonding and mechanical fastening by screws or rivets [3]. Nevertheless, these traditional techniques have their own drawbacks; indeed, as the incompatible structural, physical and chemical properties, to join polymers to metals using conventional methods is normally difficult. In the case of adhesive bonding, concerns are always on environmental issues about the restriction of volatile organic compounds emission. With regard to mechanical fastening, inflexible design is a major shortcoming. To circumvent some of these problems, Katayama [4, 5] has developed a direct laser bonding technique for joining metals to plastics, namely laser-assisted metals and plastics joining (LAMP). In fact, LAMP can also be used to join ceramics to plastics [6]. The idea is straightforward, it uses laser light to heat up the metal-plastic interface, either by transmitting the laser through the plastic to generate heat at the interface or having the laser to heat up the metal part and through thermal conduction to cause the plastic at the interface to be heated up (FIG. 1). In both cases, the plastic at the interface is melted and partly decomposed; this results in the formation of bubbles in the molten plastic, which will stay in the solidified plastic zone. It is generally accepted that the high pressure developed within laser-induced bubbles caused by rapid expansion would induce the molten plastic to have intimate contact with the metal surface and as a result, a strong mechanical anchor effect is attained as well as strong chemical bonding between the metal and plastic parts.

Indeed, LAMP has been employed to rapidly produce strong joints between commercially available metal alloys/ceramics and engineering plastics [4, 6-9]. The research results thus far have shown that the size, amount and the distribution of the bubbles are the key factors that affect the joint performance directly. Despite the achievement that has been obtained for LAMP, the features of laser-induced bubbles in the joint remain a major concern, although assisting in creating an intimate contact surface between the metal and plastic parts by inducing high pressure in the molten plastic, the bubbles by nature are defects and therefore produce a counter effect on joint strength. Unfortunately, until now, there is still no effective method that can be used to disperse large bubbles into smaller ones or to eliminate the laser-induced bubbles entirely.

Although it is well known that both laser and ultrasonic can be used independently to weld plastics to plastics and metals to metals [10, 11], they are not suitable for joining plastics to metals due to the vast differences in physical, mechanical and chemical properties between them. Nonetheless, some advancements have been made in improving traditional processes to joint plastics to metals. Roesner [12] using laser radiation to firstly treat the metal surface to create microstructures with undercut grooves. Then using laser or induction joining to melt the plastic and forced the molten plastic into those grooves to obtain interlocking effects after the plastic is solidified. A similar approach has been adopted by Yeh [13], for which he firstly used laser irradiation to ablate and to create micro-grid arrays on the metal part surface then he placed the treated metal and plastic part together as a lap joint and used ultrasonic welding to melt the plastic and form the joint after the plastic is solidified. The latter although using both laser and ultrasound, it is not a conjoint action of laser and ultrasonic, and the functions of laser irradiation and ultrasonic vibration are fundamentally different from those of the present invention.

SUMMARY OF THE INVENTION

The present invention reports the development of a new ultrasonic-aided laser joining method (UAL)—using conjoint action of laser and ultrasonic—that can address the bubble problem of LAMP. It is considered that with the aid of ultrasonic vibration, the amount of bubbles can be reduced or even be eliminated.

A first aspect of the present invention is to provide a laser joining system for joining of two dissimilar materials.

According to an embodiment of the present invention, a laser joining system for joining of a first material to a second material, comprises: a laser system for emitting at least one laser beam for irradiating a workpiece formed by placing the first material on the second material; a vibration device capable of vibrating at ultrasonic frequencies with a vibration amplitude for applying pressure on the workpiece during laser joining; and a clamping device for clamping the workpiece by applying a clamping force to the workpiece; wherein one of the first and the second materials to be joined is transparent to the laser beam.

According to an embodiment of the present invention, a laser joining system for joining of a plastic material to a non-plastic material, comprises: a laser for emitting at least one laser beam for irradiating a workpiece formed by placing the two materials together; an ultrasonic vibration device capable of vibrating at a vibration frequency with a vibration amplitude for applying pressure on the workpiece; and a clamping device for clamping the workpiece by applying a clamping force to the workpiece.

A second aspect of the present invention is to provide a method for joining two dissimilar materials with the laser joining system of the present invention.

According to an embodiment of the present invention, a method for joining a first material to a second material with the system of the present invention, comprises: placing the first material on the second material to form the workpiece; clamping the workpiece by the clamping device; irradiating the workpiece by a laser beam; and applying pressure on the workpiece via vibration of the ultrasonic vibration device; wherein one of the first and the second materials to be joined is transparent to the laser beam.

According to an embodiment of the present invention, a method for joining a plastic material to a non-plastic material with the laser joining system of the present invention, comprises: placing the plastic material on the non-plastic material to form the workpiece; clamping the workpiece by the clamping device; irradiating the workpiece by the laser beam; and applying high frequency vibration on the workpiece via the ultrasonic vibration device.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, an ultrasound aided laser joining system for joining two different materials and the corresponding operation methods are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present invention presents a new ultrasonic-aided laser joining method (UAL) for joining plastics to non-plastic materials (in particular metals and ceramics) that can eliminate the laser-induced bubbles and results in a significant improvement in joint strength.

Figure 1:
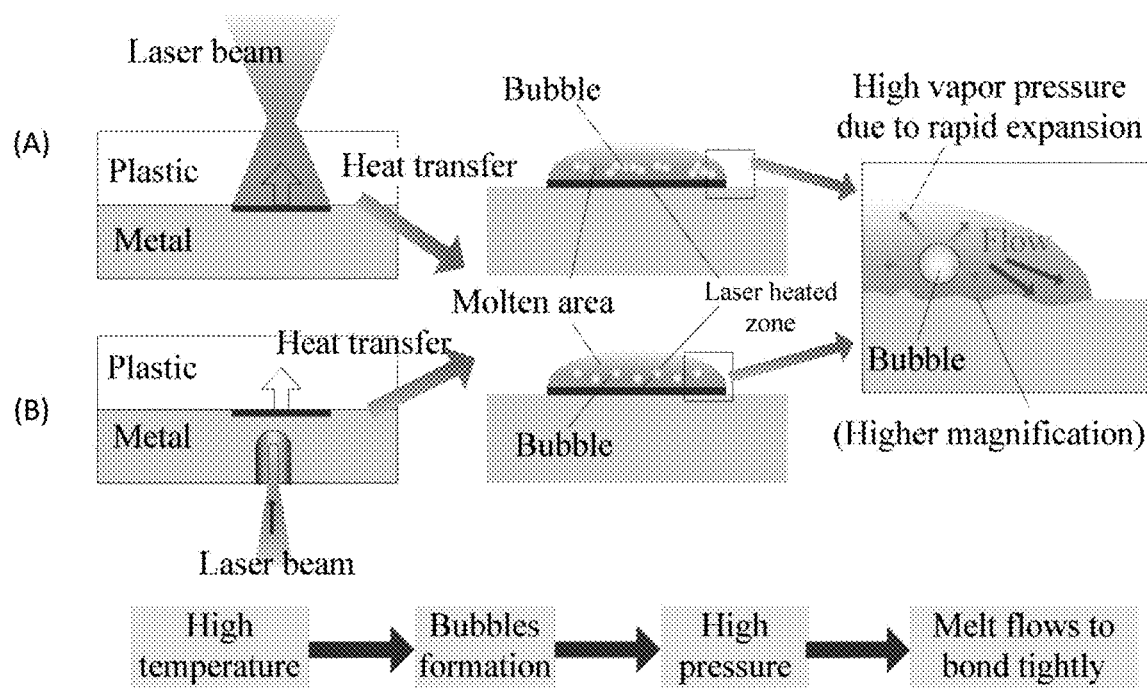
FIG. 1 shows a schematic diagram showing the conventional LAMP method [5]; (A) laser transmitting through the plastic, (B) laser to heat up the metal part.

The UAL system allows the component to be joined be ultrasonically vibrated while under laser irradiation. It composes of a laser, an ultrasonic vibration device and a component clamping device (FIG. 2A). And with the ultrasonic device make moving along the welding line, a continuous weld joint is formed. Similar to the conventional LAMP joining method, the laser will pass through the plastic material and heat up the non-plastic surface (FIG. 1A), which will then melt the adjacent plastic material at the interface; or the laser will irradiate the non-plastic part (FIG. 1B), then heat up and melt the plastic at the interface.

In UAL, ultrasound serves the purposes of (i) eliminating the laser induce bubbles, and (ii) to enhance chemical bonding between the plastic and the non-plastic part. As a result, the joint strength between the two materials is enhanced.

As shown in FIG. 2A, an ultrasound aided laser joining system comprises a laser 101, an ultrasonic vibration device 102, and a clamping device 103. A workpiece 109 clamped by the clamping device 103 is located between the laser 101 and the ultrasonic vibration device 102. The laser 101 includes a laser head 104 for focusing the laser beam. The laser 101 can be a pulsed or a continuous laser. The ultrasonic vibration device 102 is powered up and controlled by a vibration generator 105. As shown in FIG. 2B, the clamping device comprises clamp cylinders 106, a moveable plate 107, and a fixed top plate 108 which is transparent to the laser beam (in this case is quartz glass). The clamp cylinders 106 are connected to the moveable plate 107. The workpiece 109 is placed between the moveable plate 107 and the top plate 108. The laser beam can pass through the top plate 108 to irradiate on the workpiece 109. The moveable plate 107 can change the position of the workpiece 109, and a force is applied on the workpiece 109 when the workpiece 109 is in contact with the top plate 108. As shown in FIG. 2C, the ultrasonic vibration device 102 comprises a piezoelectric transducer 110, a velocity transformer 111 (to transfer the vibration energy from the transducer to the workpiece 109). The transformer 111 is attached to the transducer 110. An open channel 117 is located on the surface of the transformer 111. As shown in FIG. 2D, during operation, the workpiece 109 comprising a non-plastic sheet 112 and a plastic sheet 113 (the plastic sheet 113 is placed on above the non-plastic sheet 112, or vice versa) is located on the top surface of the transformer 111. A clamp force 116 acting on the workpiece 109 is provided by the clamping device 103. A laser beam 114 emerging from the laser head 104 radiates on the workpiece 109. Ultrasonic vibration 115, generated by the ultrasonic vibration device 102, applies on the workpiece 109 during the joining of the plastic sheet 113 to the non-plastic sheet 112 (the position of 113 and 112 can be interchanged).

EXAMPLE 1

In the present invention, both the LAMP and UAL joining experiments were conducted for a polyethylene terephthalate (PET)/titanium (Ti) pair. Titanium and its alloys are widely applied in aerospace equipment and medical applications. PET is the plastic material to be joined to Ti. It is an important material for medical devices. Its chemical formula is $(C_{10}H_8O_4)_n$. The Ti (1 mm thick, purity 99.6%) and PET (1 mm thick, amorphous) strips to be joined have the dimensions of 60 mm×25 mm×1 mm (LWT). The joining face of the titanium specimens was polished using emery paper, and all the Ti and PET specimens were cleaned in an ultrasonic bath for 10 minutes in ethanol prior to laser joining.

Figure 2:
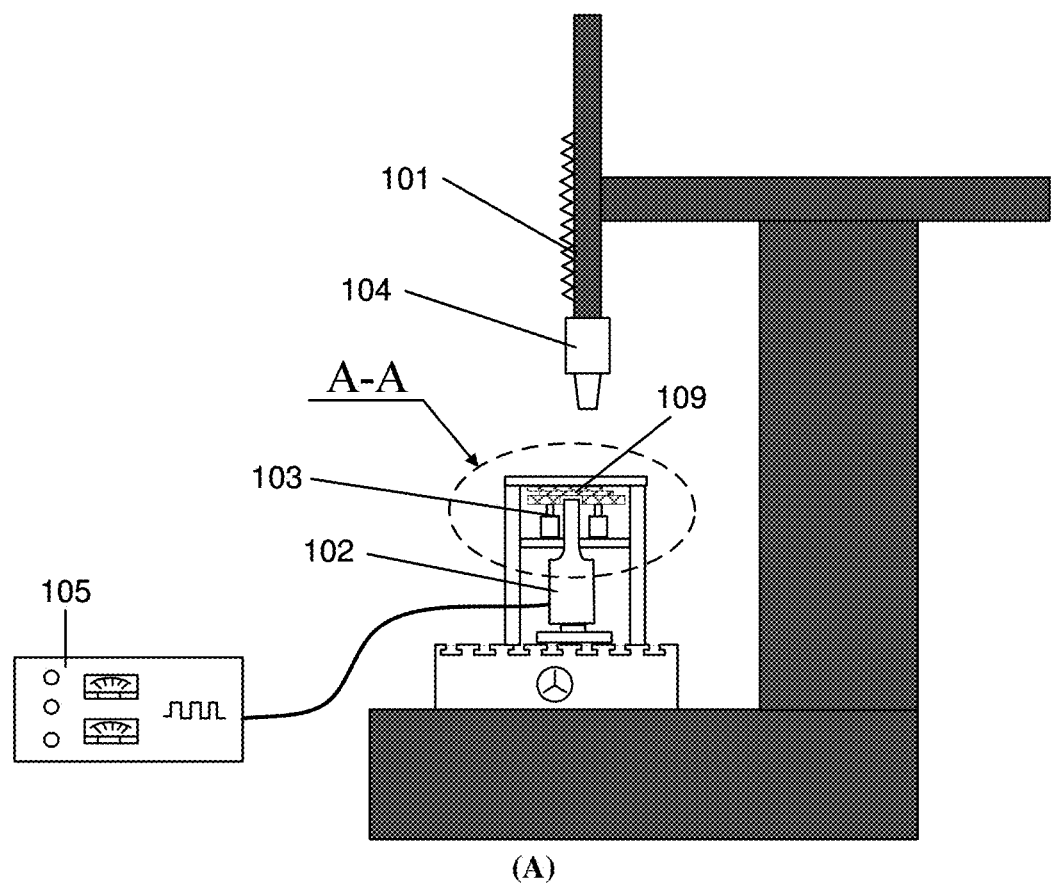
FIG. 2 shows (A) the UAL joining system, (B) the cross-sectional view of the ultrasonic vibration device and the clamping device, (C) the magnified schematic view of the ultrasonic vibration device, and (D) the operation view of the system according to an embodiment of the present invention.
Figure 2:
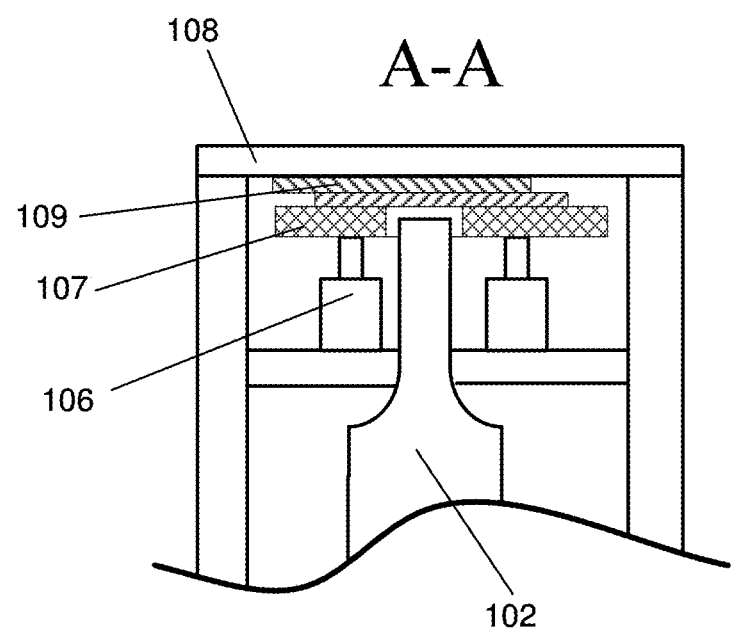
Figure 2:
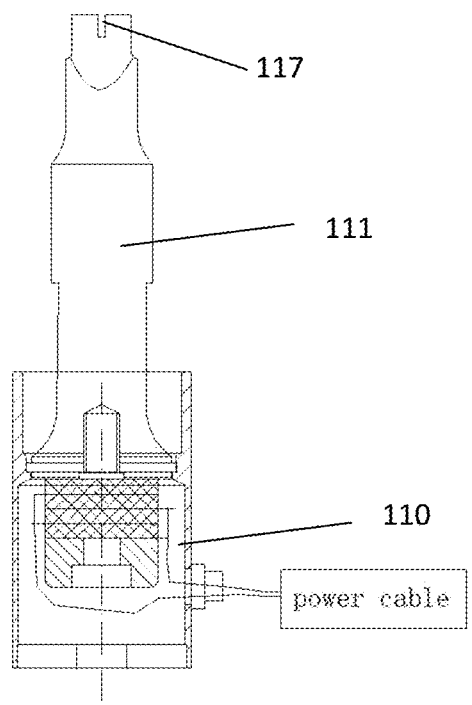
Figure 2:
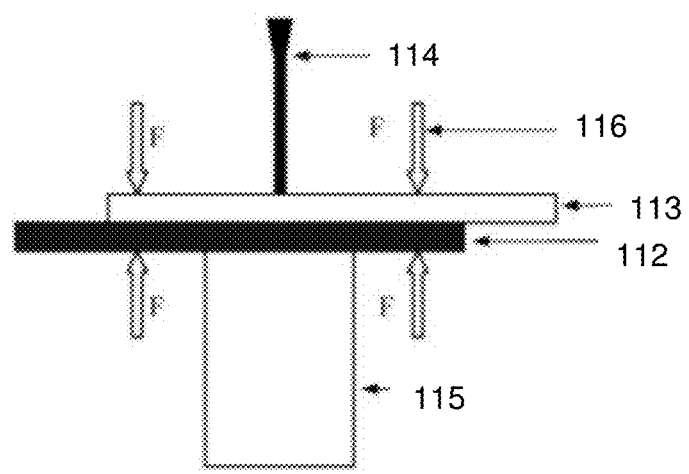

UAL joining was performed using a specially designed ultrasonic-aided laser joining system (FIG. 2). The system essentially consists of a 300 W pulsed laser, an ultrasonic vibration device capable of vibrating at a frequency of 28 kHz and a clamping device. The ultrasonic vibration device consists of a velocity transformer with an open channel at its surface (FIG. 2C) on which the workpiece is resting on. Having the open channel is more effective to remove the bubbles when comparing with that having a flat surface. The clamping device consists of a top quartz plate through which the laser beam is transmitted onto the workpiece with the two electrically driven cylinders employed to apply a clamping force to the workpiece. The workpiece has the PET sheet placed on the top of the titanium sheet. The laser beam passes through a top fixed plate which is transparent to the laser light (in this example is a quartz plate) and the PET sheet, and when it reaches the surface of the titanium sheet, due to the absorption of laser by the Ti metal, it is heated up and this causes melting and some degrees of vaporization of the contact surface of the PET sheet. The lap joint was created by using one pass of laser beam only.

During laser joining, the ultrasonic device operates at a duty cycle of 20%. Other UAL joining parameters used in this study are listed in Table 1.

TABLE 1

| The UAL joining parameters | |
|---|---|
| Laser beam focal length | 25 mm |
| Average laser power | 45-75 W |
| Laser pulse frequency | 15-25 Hz |
| Pulse duration | 8 ms |
| Laser spot diameter | 2.5 mm |
| Vibration frequency | 28 kHz |
| Vibration amplitude | 4 μm |

The chemical state of the Ti/PET joint interfaces was studied using x-ray photoelectron spectroscopy (XPS). To conduct the analysis, some LAMP and UAL joined specimens were separated at the interface by mechanical means, and the analysis was performed on the Ti part using XPS analyzer. A software was employed to make a semi-quantitative study on the quantity of bonds formed across the joint interface based on the C1s line. This is achieved by ion-milling of the surface to different depths, and the XPS analysis was performed on the etched surface after each milling time.

A tensile testing machine was used to measure the failure load of the laser jointed specimens. Testing was conducted with a crosshead speed of 0.5 mm/min, and the failure load and displacement curve was recorded. A series of tests was conducted to study the effects of the various laser processing parameters on the load-displacement curve and the fractured LAMP and UAL joined specimens were examined. For each joining condition, three specimens were tested.

Joint Appearance

Figures 3, 4:
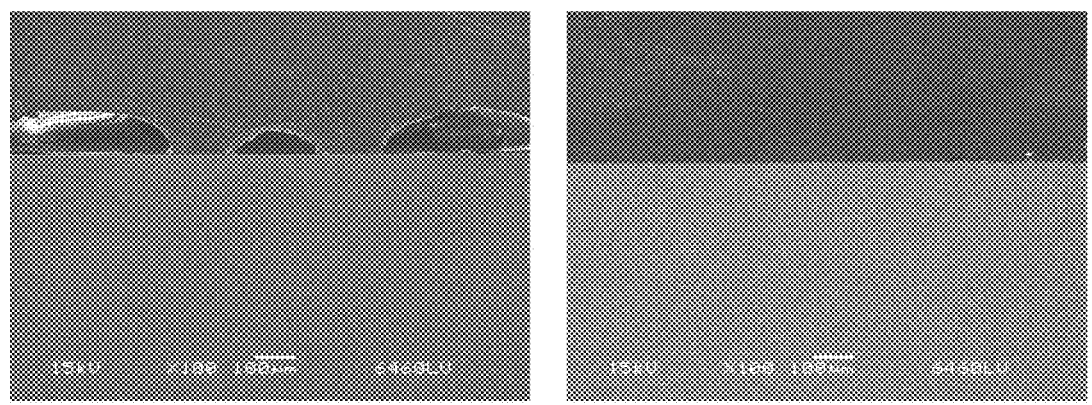
FIG. 3 shows typical joint appearances as a function of laser power for both the LAMP and UAL joined specimens according to Example 1.
FIG. 4 shows cross-sections of the joints, showing the joint interfaces of the (A) LAMP joined specimen and (B) the UAL joined specimen (laser power 55 W, frequency 20 Hz and joining speed 4 mm/s) according to Example 1.

All the joints were examined using an optical microscope. FIG. 3 shows the joint appearance as a function of laser power. The photos of the figure also compare the specimens produced using the LAMP joining method, i.e. without ultrasound applied but using the same laser processing parameters. In comparing the UAL and the LAMP joined specimens, the photos show that with the employment of ultrasonic vibration, the amount of bubbles was significantly reduced and in most cases no bubble could be observed under an optical microscope, in particular, when the laser power did not exceed 55 W. An examination of the cross-sections of the joined specimens showed that many bubbles were trapped at the interfaces of the joints of the LAMP specimens (FIG. 4A), while hardly any was found in the UAL joined specimens (FIG. 4B). The photos also show that for the LAMP method, the amount of bubbles increases when the laser power increases.

X-Ray Photoelectron Spectroscopy Analysis

Figure 5:
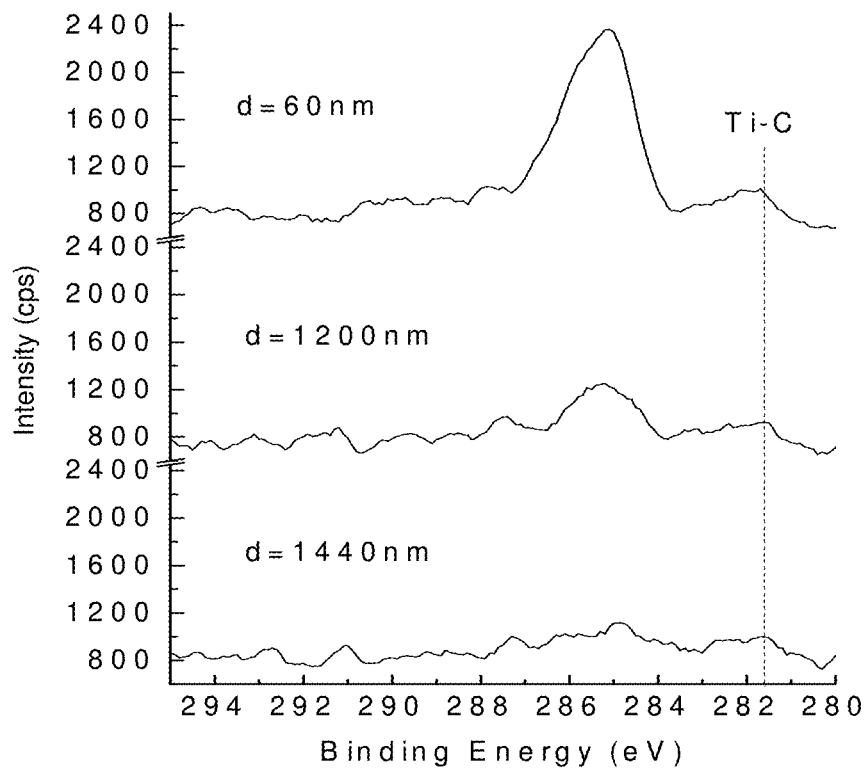
FIG. 5 shows high resolution of C1s XPS spectra taken from the Ti side of the PET/Ti specimen produced by LAMP after ion-milling to different depths according to Example 1.

The XPS results (FIGS. 5, 6) show that a new peak at 281.7 eV identified as the C1s line of Ti—C appears for both the LAMP and UAL specimens. The new peak is considered due to Ti atoms having reacted with the phenyl carbons.

Figure 6:
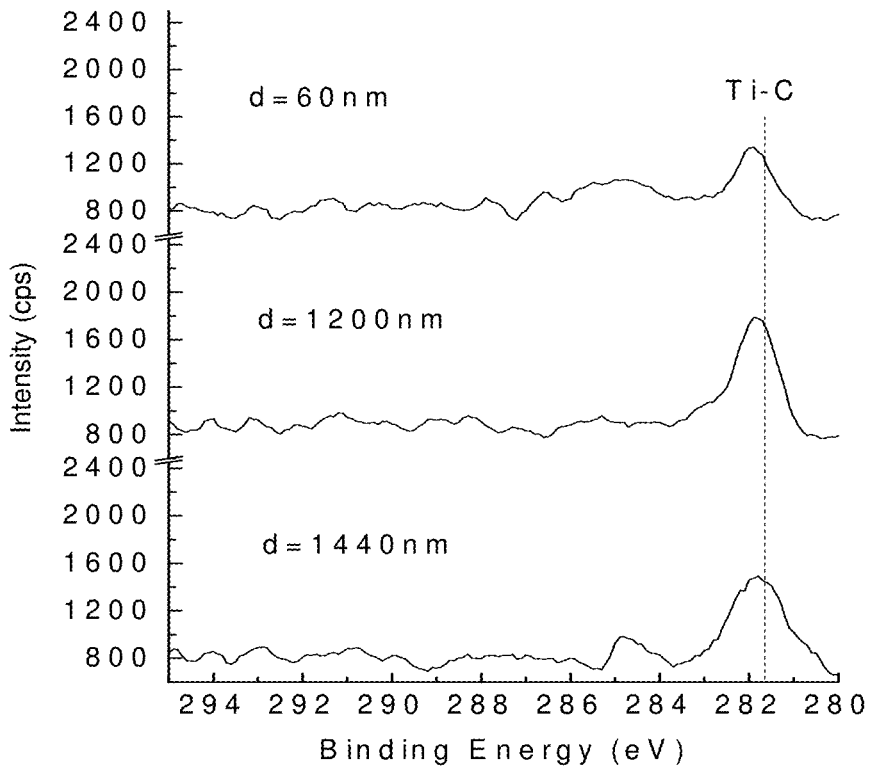
FIG. 6 shows high resolution of C1s XPS spectra taken from the Ti side of the PET/Ti specimen produced by UAL after ion-milling to different depths according to Example 1.

For the LAMP specimen, when the depth reaches 1440 nm, the energy peak of Ti—C has virtually disappeared. This suggests that the thickness of the interface for the LAMP specimen containing the new chemical bond of Ti—C was about 1440 nm. For the UAL joined specimen, it was found that the overall Ti—C peak was much higher than that of the LAMP specimen (c.f FIG. 5 and FIG. 6). FIG. 6 also indicates that at the same depth of 1440 nm a strong chemical bond of Ti—C was still present.

The higher intensities of the Ti—C bond and a thicker interface found in the UAL specimens indicate that ultrasonic vibration can enhance chemical bonding between the metal part (Ti) and the plastic part (PET).

Failure Load of Joints

Figure 7:
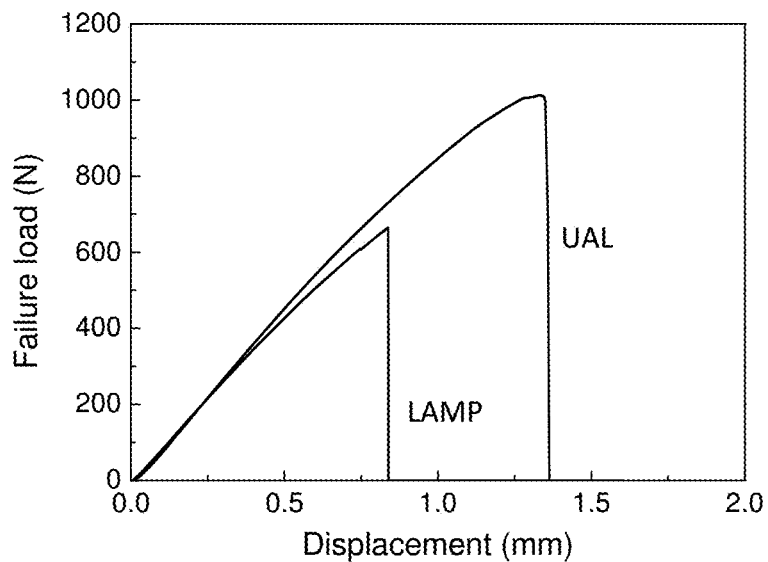
FIG. 7 shows typical load-displacement curves obtained for the LAMP and the UAL joined specimens (laser power 55 W, pulse frequency 20 Hz, travel speed 4 mm/s) according to Example 1.
Figure 8:
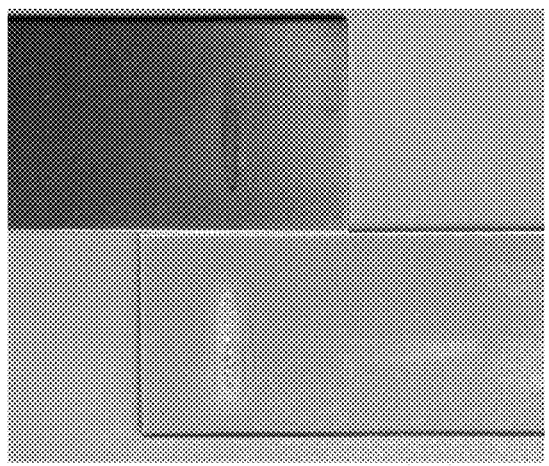
FIG. 8 shows failure appearance of a LAMP specimen according to Example 1.
Figure 9:
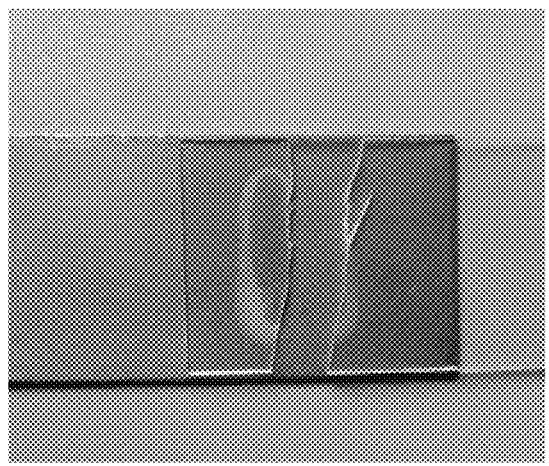
FIG. 9 shows failure appearance of a UAL joined specimen according to Example 1.

Typical load-displacement curves of the LAMP and the UAL joined specimens are shown in FIG. 7. While FIGS. 8 and 9, respectively, show the failure aspect of the LAMP and UAL specimens after the test. For the LAMP specimens, all fractures occurred at the metal-plastic interface (FIG. 8), whereas for the UAL joined specimens, fracture occurred in the parent plastic material (FIG. 9). These results indicate that the UAL joined specimens have higher metal-plastic interfacial bond strength than that of the LAMP specimens.

Figure 10:
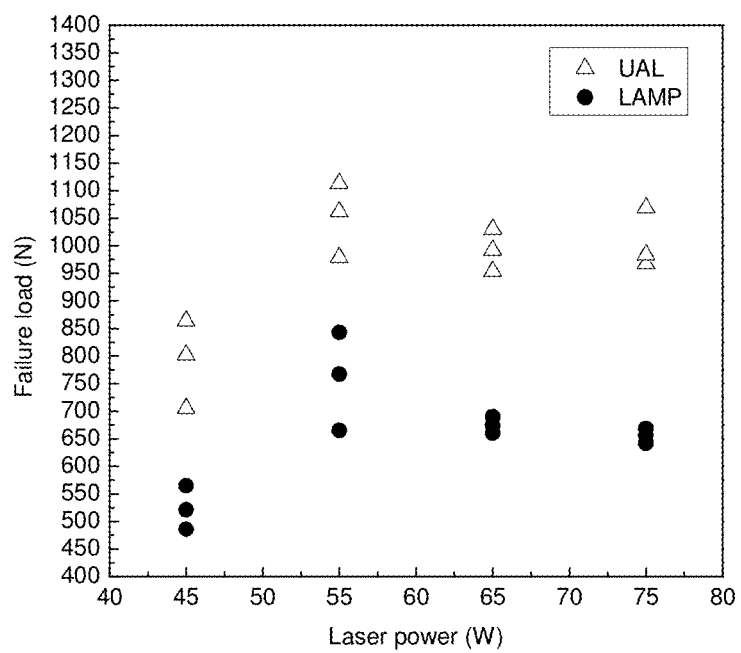
FIG. 10 shows the effects of laser power on failure load (laser pulse frequency 20 Hz, travel speed 4 mm/s) according to Example 1.

With regard to the effects of laser power on joint strength, a similar trend is observed for both the LAMP and the UAL joined specimens (FIG. 10). The load increases initially with an increase in power and reaches a maximum at 55 W, then decreases when the power increased further. An increase of about 38% in failure load was obtained when ultrasound was applied with a laser power of 55 W (FIG. 10) (average failure load for UAL=1051 N; average failure load for LAMP=758 N).

EXAMPLE 2

Some more experiments using low laser power have been performed. The idea is to prevent vaporization of the plastic and the formation of bubbles in the joint at the first place for both the LAMP and UAL methods, and to prove that for such conditions, the present invention is also better than (in terms of failure load) the conventional LAMP method. The UAL consists of a laser source (which in this example is a 300 W pulsed laser), an ultrasonic vibration device (which is capable of vibrating at a frequency of 28 kHz) and an apparatus clamping device. The joining parameters used in the experiment are given in Table 2.

TABLE 2

| Joining Parameters | |
| --- | --- |
| Laser beam focal length | 25 mm |
| Laser power | 30 W |
| Laser pulse frequency | 15 Hz |
| Pulse duration | 8 ms |
| Spot size of the laser beam | Ø 2.5 mm |
| Ultrasonic vibration frequency | 28 kHz |
| Ultrasonic vibration amplitude | 2 µ-6 µm |

To perform UAL joining, the plastic sheet is placed on top of the metal sheet. The laser beam passes through a quartz plate and a plastic sheet, and when it reaches the metal surface, heat is absorbed by the metal, and as a result, the contact surface of the plastic sheet is melted but no vaporization occurs. The laser power energy was kept to the limit of 30 W to avoid decomposition of the polymer and the formation of laser-induced bubbles, which are detrimental to joint strength. The lap joint was created by using one pass of the laser beam only. This produces a lap-joint length of about 15 mm.

Materials and Analysis of Joints

The materials to be joined were polyethylene terephthalate (PET) sheets and Ti sheets (99.6% purity). The PET sheets are highly transparent and their chemical formula is $(C_{10}H_8O_4)_n$. The dimensions of the Ti and PET strips to be joined are 60 mm×20 mm×1 mm (LWT). The surfaces of all samples were ultrasonically cleaned in an ethanol bath for 10 minutes.

The chemical bonds were identified using an XPS analyzer, and a tensile testing machine was used to evaluate the quality of the joint. To perform the XPS study of the joint interface, the PET/Ti joint was separated by mechanical means. In order to examine the chemical bonds across the joint interface, an Ar-ion beam was used to etch the sample surface to various depths below the fracture surface. A software was used to provide a semi-quantitative analysis of the bonds formed across the joint interface based on the C1s line.

Joint Appearance and Failure Load

Figure 11:
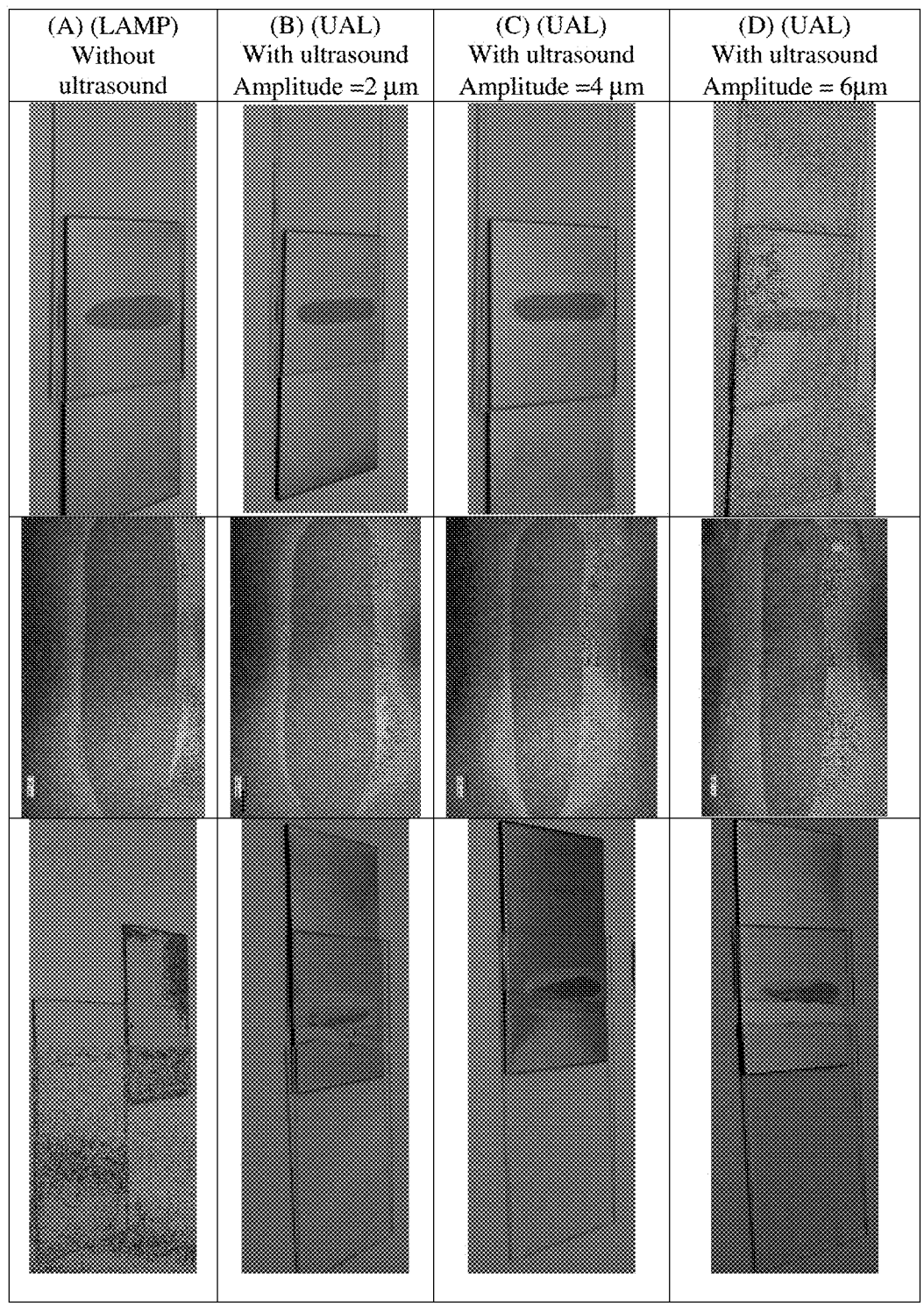
FIG. 11 shows typical joints formed by the LAMP and UAL methods with the fractured specimens according to Example 2 (produced using a low laser power of 30 W)

The joints formed with and without ultrasonic vibration were examined using an optical microscope. FIG. 11 shows typical joint appearances and failure appearances of the LAMP joined specimens and UAL joined specimens. For all specimens which were processed using a laser power of 30 W, no bubble (porosity) was observed in the joint. It was found that if a laser power higher than 30 W was used, many bubbles would develop in the joint (FIG. 3 of Example 1 of the LAMP joints).

Figure 12:
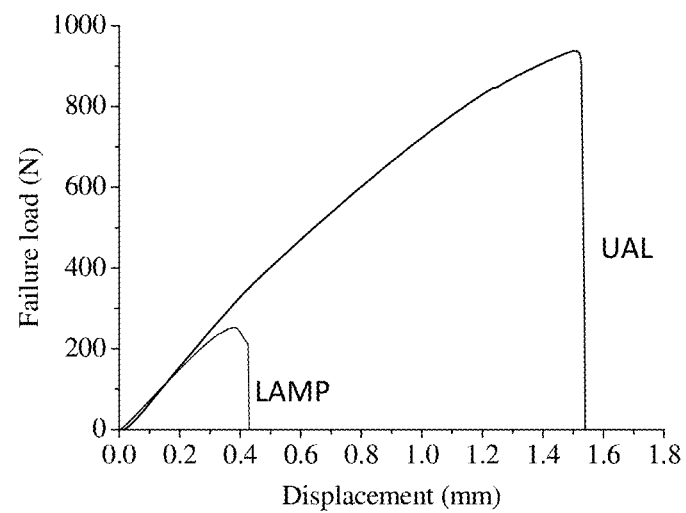
FIG. 12 shows typical load-displacement curves obtained for the LAMP and UAL specimens according to Example 2 (produced using a low laser power of 30 W)
Figure 13:
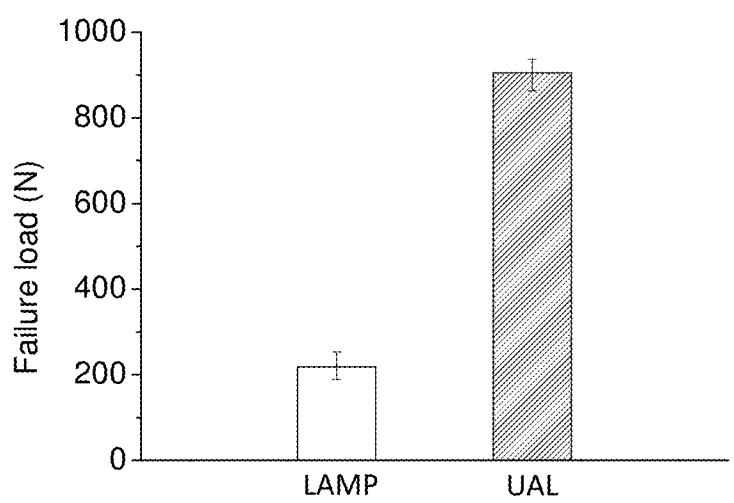
FIG. 13 shows a comparison of failure load for the LAMP and UAL specimens according to Example 2 (produced using a low laser power of 30 W)

FIGS. 12 and 13 show the results of the failure load of the joints formed with and without ultrasonic vibration. The results clearly illustrate that failure load increased significantly when ultrasonic vibration was applied, and the improvement can be as high as fourfold (FIG. 13). The difference in failure load between the joints formed with and without ultrasonic vibration is apparent when their fracture modes were considered. The one without vibration failed at the interface between the metal and plastic parts; while for the specimens with ultrasonic aid, the fracture occurred in the plastic part (FIG. 11).

XPS Analysis

Figure 14:
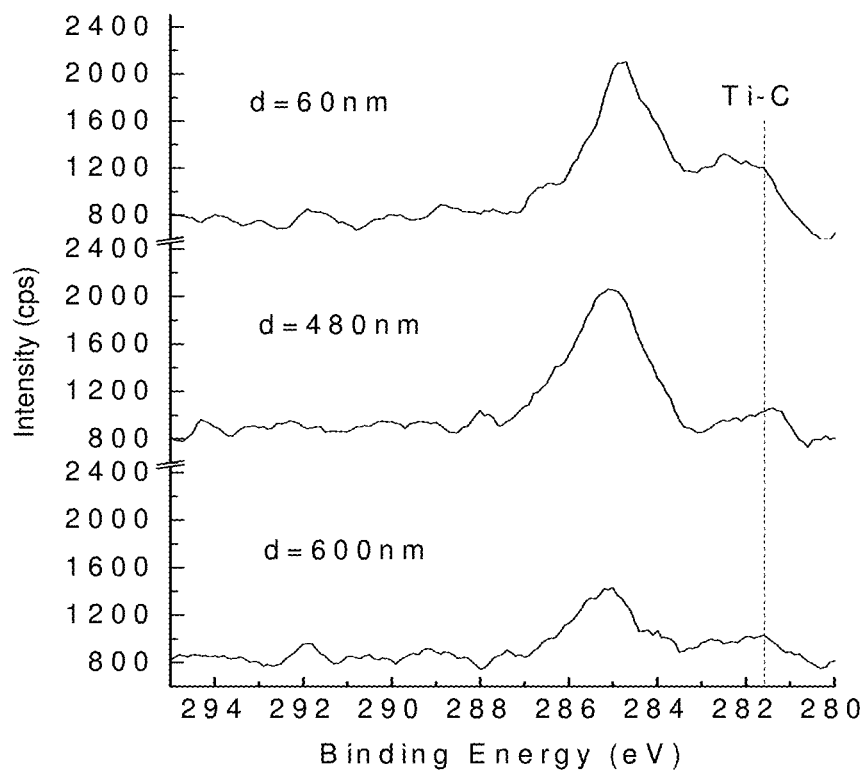
FIG. 14 shows high resolution of C1s XPS spectra taken from the Ti side of a LAMP specimen at different ion-milling depths according to Example 2.
Figure 15:
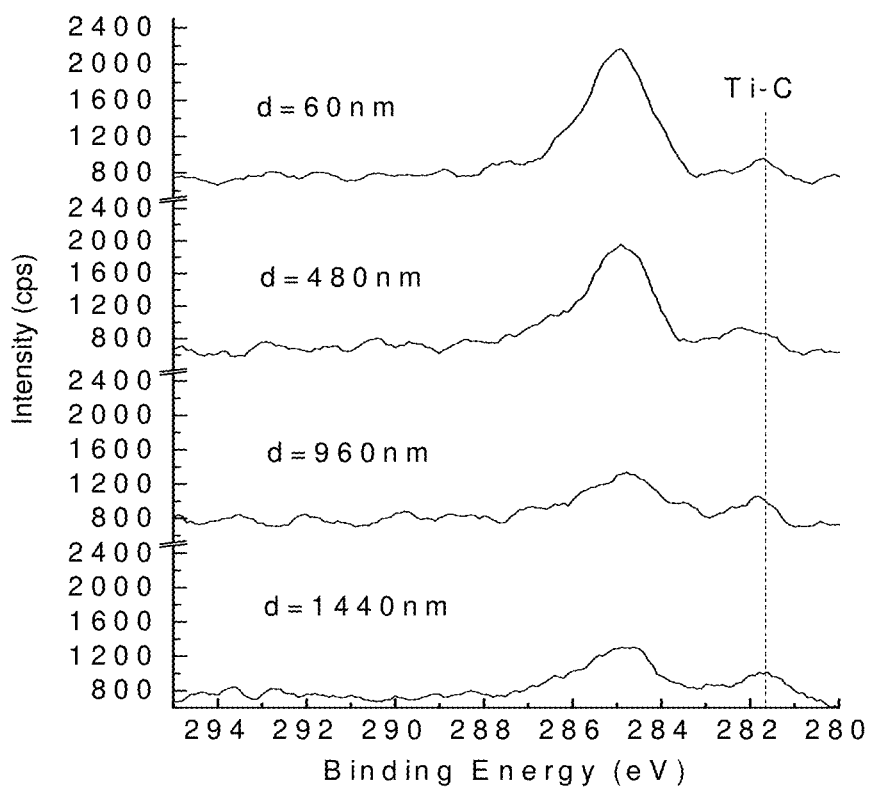
FIG. 15 shows high resolution of C1s XPS spectra taken from the Ti side of a UAL specimen at different ion-milling depths according to Example 2.

XPS was performed across the joint interface by ion-milling to different depths from the Ti surface. At a milling depth of 60 nm, similar to Example 1, a new peak at approximately 281.7 eV, which identified to be the C1s line of Ti—C was observed for both specimens (FIG. 14 and FIG. 15). FIGS. 14 and 15 also show that for the LAMP specimen, the peak at 281.7 eV virtually disappeared when milling depth reached 600 nm. This suggests that thickness of the interface containing the new chemical bond of Ti—C was about 600 nm. However, for the UAL specimen, this happens at the depth of 1440 nm. This indicates that the thickness of the interface containing the new chemical bond of Ti—C was significantly thicker than that of the LAMP joint.

Concluding Remarks of Examples 1 and 2

Ultrasonic vibration was applied to the joint zone in laser joining of PET plastic to Ti metal with the aim of improving the joint strength. The effects of ultrasonic vibration on joint appearance, chemical bonds across the joint interface and the failure load of the joint were studied. The major findings are summarized as follows.

For the conventional LAMP joining method, above a certain laser power, the formation of bubbles in the joint zone is inevitable and the amount is largely depending on laser power; the higher the power, the more bubbles will be. On the other hand, bubbles can be virtually eliminated for the UAL method, except for the condition of a high laser power input, which within the window of this study was above 55 W (Example 1).

For both the joints formed with and without ultrasonic vibration (i.e. UAL and LAMP methods), no bubbles were observed when a low laser power was used, which in this case was 30 W (Example 2).

Ultrasonic vibration promotes chemical reactions between molten PET and Ti metal. The XPS results showed that the UAL specimens have higher bond intensity of Ti—C at the joint interface than the LAMP specimens.

Compare the fracture load of the LAMP and UAL specimens, (both produced by low and high laser powers, i.e. Examples 1 and 2) the failure load of the latter was significantly higher than that of the former.

The improvement obtained for the joints formed using UAL is due to the absence of bubbles in the joint and/or a strong chemically bonded interface is formed.

It is believed that the UAL method can be applied to other plastic-metal pairs and not limited to PET-Ti with similar effects.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed are:

1. A laser joining system for joining of a first material to a second material comprising:
   a laser system for emitting a laser beam for irradiating a top surface of a workpiece comprising a first sheet of the first material and a second sheet of the second material, the first sheet being located on top of the second sheet such that a top surface of the first sheet forms the top surface of the workpiece, a bottom surface of the second sheet forms a bottom surface of the workpiece and a joint interface is formed between the first sheet and the second sheet, wherein the first material is a plastic being transparent to the laser beam; and the second material is a metal or a ceramic;
   an ultrasonic vibration device comprising a transducer and a transformer allowing transfer of vibration energy from the transducer to the workpiece and being capable of vibrating at an ultrasonic frequency with a vibration amplitude for applying pressure on molten plastic at the join interface through the second sheet by contacting the bottom surface of the workpiece with a top surface of the transformer to remove laser-induced bubbles from the molten plastic during laser joining; and
   a clamping device comprising one or more clamp cylinders, a moveable plate, and a top fixed plate, the top fixed plate being transparent to the laser beam, the workpiece being located between the moveable plate and the top fixed plate, the one or more clamp cylinders being for clamping the moveable plate and the top fixed plate, the clamping device being located between the laser system and the ultrasonic vibration device such that the top surface of the workpiece is irradiated by the laser beam and the bottom surface of the workpiece is rested on the top surface of the transformer;
   wherein the pressure applied on the molten plastic at the joint interface reduces or eliminates the laser-induced bubbles from the molten plastic at the joint interface thereby enhancing chemical bonding between the plastic and the second material thereby enhancing bond strength of the workpiece.

2. The laser joining system of claim 1, wherein the laser beam is pulsed or continuous.

3. The laser joining system of claim 1, wherein the top surface of the transformer has an open channel for improving the removal of the laser-induced bubbles from the molten plastic at the joint interface.

4. A method for joining a first material to a second material with the laser joining system of claim 1, the method comprising:
   placing a first sheet of the first material on top of a second sheet of the second material to form a workpiece such that a top surface of the first sheet forms a top surface of the workpiece, a bottom surface of the second sheet forms a bottom surface of the workpiece and a joint interface is formed between the first sheet and the second sheet, wherein the first material is a plastic being transparent to a laser beam emitted from the laser system; and the second material is a metal or a ceramic;
   clamping the workpiece between the laser system and the ultrasonic vibration device with the clamping device in a way that the workpiece is placed between the top fixed plate and the moveable plate such that the top surface of the workpiece is irradiated by the laser beam and the bottom surface of the workpiece is rested on the top surface of the transformer;
   irradiating the top surface of the workpiece by the laser beam along a welding line such that the laser beam passes through the top fixed plate and the first sheet to melt a contact surface of the first sheet at the joint interface thereby forming molten plastic containing laser-induced bubbles at the joint interface; and
   applying pressure on the molten plastic at the joint interface through the second sheet by contacting the bottom surface of the workpiece with the top surface of the transformer at an ultrasonic frequency with a vibration amplitude along the welding line to remove the laser-induced bubbles from the molten plastic at the joint interface thereby enhancing chemical bonding between the plastic and the second material thereby enhancing bond strength of the workpiece.

5. The method of claim 4, wherein the plastic is polyethylene terephthalate (PET) and the metal is titanium (Ti).

6. The method of claim 4, wherein the laser beam has an average power in a range of 30 W to 75 W.

7. The method of claim 4, wherein the laser beam has a pulse frequency in a range of 15 Hz to 25 Hz.

8. The method of claim 4, wherein the laser beam operates at pulse duration in a range of 6 ms to 10 ms.

9. The method of claim 4, wherein the vibration amplitude is in a range of 2 µm to 6 µm.

10. The method of claim 4, wherein the top surface of the transformer has an open channel for improving the removal of the laser-induced bubbles from the molten plastic at the joint interface.

\* \* \* \* \*